(12) United States Patent
Kim et al.

(10) Patent No.: US 8,679,244 B2
(45) Date of Patent: Mar. 25, 2014

(54) ASPHALT COMPOSITIONS MODIFIED BY STYRENIC BLOCK COPOLYMER AND VEGETABLE WAX

(75) Inventors: Jae Yun Kim, Daejeon (KR); Min Sung Kwon, Daejeon (KR); Eun Kyung No, Daejeon (KR); Sun Woo Cheen, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 79 days.

(21) Appl. No.: 13/330,958

(22) Filed: Dec. 20, 2011

(65) Prior Publication Data

US 2013/0123395 A1 May 16, 2013

(30) Foreign Application Priority Data

Nov. 16, 2011 (KR) ........................ 10-2011-0119871

(51) Int. Cl.
| C08L 95/00 | (2006.01) |
| C08L 53/00 | (2006.01) |
| C08L 53/02 | (2006.01) |
| C08L 91/00 | (2006.01) |
| C08L 91/06 | (2006.01) |

(52) U.S. Cl.
USPC .................... 106/273.1; 106/14.34; 106/270; 524/59; 524/68

(58) Field of Classification Search
USPC ............. 524/9, 59, 68; 106/14.34, 273.1, 270
See application file for complete search history.

(56) References Cited

U.S. PATENT DOCUMENTS

| 3,345,316 | A | 10/1967 | Nielsen |
| 3,985,694 | A | 10/1976 | Petrucco et al. |
| 4,130,516 | A | 12/1978 | Gagle et al. |
| 4,412,019 | A | 10/1983 | Kraus |
| 4,994,508 | A * | 2/1991 | Shiraki et al. .................. 524/14 |
| 5,130,354 | A | 7/1992 | Gelles |
| H1580 | H | 8/1996 | Kluttz |
| 2009/0004387 | A1* | 1/2009 | Trumbore et al. ............ 427/289 |

FOREIGN PATENT DOCUMENTS

| KR | 10-2002-0013709 A | 2/2002 |
| KR | 10-0770785 B | 10/2007 |
| KR | 10-0949380 B | 3/2010 |

* cited by examiner

*Primary Examiner* — James J Seidleck
*Assistant Examiner* — Deve E Valdez
(74) *Attorney, Agent, or Firm* — Frommer Lawrence & Haug LLP; Ronald R. Santucci

(57) ABSTRACT

Disclosed is a modified asphalt composition including a styrenic block copolymer and a vegetable wax as modifier. With lower viscosity at high temperatures as compared to the asphalt composition modified only with the styrenic block copolymer, it can be manufactured and used at lower temperatures. Also, with higher ductility at low temperatures, it can minimize fatigue crack even in cold weathers.

12 Claims, No Drawings

ASPHALT COMPOSITIONS MODIFIED BY STYRENIC BLOCK COPOLYMER AND VEGETABLE WAX

CROSS-REFERENCE TO RELATED APPLICATIONS

This application claims priority under 35 U.S.C. §119 to Korean Patent Application No. 10-2011-0119871, filed on Nov. 16, 2011, in the Korean Intellectual Property Office, the disclosure of which is incorporated herein by reference in its entirety.

BACKGROUND (a) Technical Field

The present invention relates to a modified asphalt composition containing a styrenic block copolymer and a vegetable wax as modifier.

(b) Background Art

In general, unmodified asphalt behaves very sensitively to temperature during road paving or water-proof sheet manufacturing. At high temperatures, it is vulnerable to plastic deformation by heat or load. Meanwhile, at low temperatures, it may experience cracking due to fatigue crack from the bottom portion caused by repeated load and repeated expansion and contraction from the top portion caused by abrupt temperature change. After the pavement, the resistance of asphalt to plastic deformation, temperature sensitivity, fatigue crack, low-temperature cracking, etc., decreases rapidly with time as the traffic volume and mid-to-large vehicles increase.

To solve this problem, polymers are used to modify asphalt recently. For example, low-density polyethylene, ethylene vinyl acetate, styrene-butadiene rubber, butyl rubber, etc., are used as asphalt modifier. By adding these polymers to asphalt, resistance to plastic deformation caused by softening at high temperature is improved and cracking caused by repeated low and repeated expansion and contraction at low temperature is prevented. The use of asphalt modified with polymers in road pavement is gradually increasing.

Asphalt modified with polymers has been intensively studied. For example, U.S. Pat. Nos. 3,985,694 and 4,130,516 disclose asphalt/polymer compositions in which thermoplastic elastomers such as linear polyethylene, ethylene vinyl acetate or styrene-butadiene rubber are added as asphalt modifier to improve physical properties. Further, U.S. Pat. No. 3,345,316 discloses an asphalt composition comprising a chlorinated polyphenyl resin in which a thermoplastic elastomer such as a linear styrene-butadiene-styrene triblock copolymer or a styrene-ethylene-butylene-styrene block copolymer prepared by anionic polymerization is included. US Statutory Invention Registration No. H1580 discloses an asphalt composition comprising a radial styrene-butadiene-styrene block copolymer. U.S. Pat. No. 4,130,516 discloses an asphalt composition comprising asphalt, sulfur and a polymer. U.S. Pat. No. 5,130,354 discloses an asphalt composition comprising a butadiene rubber or a styrene-butadiene-styrene triblock copolymer in which a conjugated diene is grafted using a silane compound or maleic anhydride as a modifier. U.S. Pat. No. 4,412,019 discloses an asphalt composition comprising asphalt, sulfur and a styrene-ethylene-butylene-styrene block copolymer. In addition, Korean Patent Registration No. 10-0,712,579 discloses an asphalt composition using a mixture of a linear styrene-butadiene-styrene triblock copolymer and a radial styrene-butadiene-styrene triblock copolymer as an asphalt modifier.

The above-described methods are aimed at improving the physical properties of asphalt such as high-temperature properties, low-temperature properties, aging resistance, resistance to plastic deformation, etc., by adding polymer modifiers. However, the addition of the polymer modifier results in increased viscosity at high temperature as compared to that of pure asphalt. Accordingly, high temperature is required for the preparation of asphalt and road pavement, which results in increased emission of carbon dioxide and toxic gas as well as increased consumption of fuels for providing the required high temperature. In addition, considerable time is needed for the asphalt to cool to ambient temperature.

Thus, researches have been made about use of wax instead of the polymer modifier as modifier in order to solve the high viscosity problem of asphalt at high temperatures.

Korean Patent Registration No. 10-0,770,785 presents addition of a polyethylene-based wax to asphalt to decrease viscosity of asphalt at high temperature and thus to solve the problem of increased temperature and time. However, the use of the polyethylene-based wax causes the problem of low-temperature cracking.

Korean Patent Registration No. 10-0,949,380 discloses an asphalt composition comprising a polyethylene-based wax as well as a vegetable wax as modifier instead of the polymer modifier. While decreasing viscosity at high temperature through the addition of the polyethylene-based wax, the patent also solves the problem of rapid decrease of ductility at low temperature by adding the vegetable wax.

In general, waxes are solid at ambient temperatures and become liquid at elevated temperatures. They have a molecular weight of several hundreds. The wax that has been used as asphalt modifier is the polyethylene-based wax. By rapidly decreasing the viscosity of asphalt at temperatures above the melting temperature of the wax and becoming solid at temperatures below the melting temperature, it is expected to solve the high viscosity problem of the asphalt containing the polymer modifier at high temperatures. But, although the polyethylene-based wax can decrease the viscosity of asphalt, it causes low-temperature cracking of the asphalt mixture. The low-temperature cracking occurs mainly in winter. It is characterized by cracks formed in the transverse direction of the pavement because of imbalance in the temperature distribution and propagated from the top portion to the bottom portion. The ductility at low temperature has a decisive effect on the physical properties of asphalt. A low ductility results in rapid breakage because of fatigue caused by loads or cracking caused by thermal expansion and contraction. Accordingly, the problem of decreased ductility of asphalt including the polyethylene-based wax as modifier at low temperature needs to be solved.

As described above, although the addition of the polymer modifier significantly improves the physical properties of asphalt, the asphalt modified with polymers requires high temperature for manufacturing because of high viscosity at high temperature. Although there have been efforts to improve the high viscosity problem at high temperature by using a wax instead of the polymer modifier and thus lowering the manufacturing temperature, physical properties at low temperature are becoming another problem. Accordingly, development of a modifier capable of solving the problems of the physical properties asphalt and their preparation is still required.

SUMMARY

The present invention is directed to providing a novel asphalt modifier satisfying both high-temperature and low-temperature properties.

In one general aspect, the present invention provides a modified asphalt composition comprising: a) asphalt; b) a styrenic block copolymer represented by the chemical formula 1 or 2; and c) a vegetable wax.

In another general aspect, the present invention provides a modified asphalt composition comprising: a) asphalt; and b) a styrenic block copolymer represented by the chemical formula 1 or 2 in which a vegetable wax is incorporated.

(1)

(2)

In the chemical formulae 1 and 2, A is a unit comprising an aromatic vinyl monomer having a weight-average molecular weight ($M_w$) of 3,000-30,000; B is a unit comprising a conjugated diene monomer or a unit comprising a conjugated diene monomer and an aromatic vinyl monomer, having a weight-average molecular weight ($M_w$) of 20,000-200,000; n is an integer of 2 to 6; and X is a residue of a coupling agent.

The above and other aspects and features of the present invention will be described infra.

DETAILED DESCRIPTION

Hereinafter, reference will now be made in detail to various embodiments of the present invention. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention uses a styrenic block copolymer as well as a vegetable wax as asphalt modifier. The styrenic block copolymer and the vegetable wax may be included in asphalt alone or in admixture.

The styrenic block copolymer and the vegetable wax used as asphalt modifier in the present invention will be described in detail.

First, the styrenic block copolymer may be represented by the chemical formula 1 or 2.

In the styrenic block copolymer represented by the chemical formula 1 or 2, A is a unit comprising an aromatic vinyl monomer having a weight-average molecular weight ($M_w$) of 3,000-30,000, specifically 10,000-25,000, and B is a unit comprising a conjugated diene monomer or a unit comprising a conjugated diene monomer and an aromatic vinyl monomer, having a weight-average molecular weight ($M_w$) of 20,000-200,000, specifically 40,000-150,000. When the weight-average molecular weight ($M_w$) of the unit of the styrenic block copolymer is too large, processability may be problematic. In contrast, if the weight-average molecular weight ($M_w$) is too small, the block copolymer may not provide desirable mechanical properties. And, in the styrenic block copolymer represented by the chemical formula 1, n may be an integer of 2 to 6, specifically 2 to 4. The styrenic block copolymer represented by the chemical formula 1 always includes the (A-B) diblock, and the content of the (A-B) diblock may be expressed as the coupling ratio.

In the styrenic block copolymer represented by the chemical formula 1 or 2, the content of the unit A may be 5-40 wt %, specifically 20-40 wt %, based on the weight of the block copolymer. When the content of the unit A in the block copolymer is too low, the block copolymer may have undesirable mechanical properties. In contrast, if the content is too high, the ductility of asphalt may decrease.

The unit A of the styrenic block copolymer represented by the chemical formula 1 or 2 may have a weight-average molecular weight ($M_w$) of 3,000-50,000, specifically 3,000-30,000. The aromatic vinyl monomer comprising the unit A may be selected from a group consisting of styrene, u-methylstyrene, o-methylstyrene, p-methylstyrene and p-tert-butylstyrene. Specifically, the aromatic vinyl monomer may be styrene.

The unit B of the styrenic block copolymer represented by the chemical formula 1 or 2 may have a weight-average molecular weight ($M_w$) of 20,000-200,00, specifically 20,000-150,000. Specifically, the conjugated diene monomer of the unit B may be 1,3-butadiene.

The vinyl content of the unit B of the block copolymer may be 10-80 mol %, specifically 25-50 mol %.

The styrenic block copolymer represented by the chemical formula 1 may have a weight-average molecular weight ($M_w$) of 50,000-400,000, and the styrenic block copolymer represented by the chemical formula 2 may have a weight-average molecular weight ($M_w$) of 50,000-200,000.

The wax used in the present invention as modifier is a vegetable wax. The vegetable wax is used to improve the viscosity problem of asphalt at high temperature as well as its low-temperature properties and may be any vegetable wax commonly used in the art. The vegetable wax may be any wax obtained from natural sources, including hydrogenated in vegetable wax, modified vegetable wax, etc. Representatively, the vegetable wax may be palm wax extracted from coconut. The palm wax has a melting temperature of approximately 60° C. Also, the hydrogenated wax obtained from hydrogenation of wax can be used. Hydrogenated palm wax has a melting temperature of approximately 55-65° C. Also, wax modified to improve physical properties can be used. For example, palm wax modified with sodium hydroxide (NaOH) and stearic acid ($CH_3(CH_2)_{16}COOH$) to increase the melting point may be used. The modified palm wax has a melting temperature of approximately 80-110° C.

At present, the polyethylene-based wax is used as a modifier for warm mix asphalt. The polyethylene-based wax has a melting point of 95° C.-125° C. and a long, linear structure. The polyethylene-based wax is problematic in that the low-temperature properties of asphalt are degraded due to the crystallization of the linear structure. In contrast, the vegetable wax used in the present invention is a mixture of saturated and unsaturated fatty acids and has a melting point of 55-110° C. It can decrease viscosity at high temperatures while improving the low-temperature properties of the modified asphalt.

Now, the asphalt composition comprising the modifier will be described in detail.

The present invention provides an asphalt composition comprising: a) asphalt; b) a styrenic block copolymer represented by the chemical formula 1 or 2; and c) a vegetable wax. The present invention also provides an asphalt composition comprising: a) asphalt; and b) a styrenic block copolymer represented by the chemical formula 1 or 2 in which a vegetable wax is incorporated.

The asphalt used in the present invention may be common asphalt, including ones naturally occurring and produced from petroleum. In particular, petroleum-based, straight asphalt, asphalt cement, blown asphalt, etc., may be used. However, the present invention is not particularly limited in the selection of asphalt.

The styrenic block copolymer may be included in an amount of 0.5-40 parts by weight, specifically 1-20 parts by weight, based on 100 parts by weight of the asphalt. When the content of the styrenic block copolymer is too low, the modifier may not exert its function in the asphalt composition. In contrast, if the content is too high, the modified asphalt may become viscous at high temperature and thus have undesirable dispersibility and flowability. In addition, thermal decomposition of the asphalt binder may occur due to retarded dispersion and mechanical decomposition may occur due to shear stress.

The vegetable wax may be included in an amount of 0.25-30 parts by weight, specifically 1-15 parts by weight, based on 100 parts by weight of the asphalt. When the content of the vegetable wax is too low, it is difficult to attain improved viscosity of the asphalt composition at high temperatures. In contrast, if the content is too high, it is difficult to maintain the physical properties of the asphalt. Especially, the softening point may decrease rapidly.

The styrenic block copolymer and the vegetable wax may be used in admixture. Also in this case, the contents of the styrenic block copolymer and the vegetable wax are maintained within the above-described ranges.

EXAMPLES

The examples and experiments will now be described. The following examples and experiments are for illustrative purposes only and not intended to limit the scope of this invention.

Preparation Examples

Preparation of Styrenic Block Copolymer

Preparation Example 1

Preparation of Styrenic Block Copolymer

A 2-L high-pressure reactor was sufficiently purged with argon gas. Then, after adding purified cyclohexane (900 g), THF (2,000 ppm) and styrene (31 g), temperature was maintained at 60° C. Then, n-butyllithium (BuLi; 1 mmol in cyclohexane, 2 M) was added to the reactor as initiator. When the polymerization temperature reached the highest temperature, butadiene (138 g) was added 10 minutes later. When the polymerization temperature reached the highest temperature, styrene (31 g) was added to the reactor 5 minutes later. Then, methanol was added to the polymerization solution as polymerization terminator to completely terminate living polymerization. After adding an antioxidant to the resulting polymerization solution, followed by removal of cyclohexane using a roll mill, a styrenic block copolymer (1) was prepared.

Preparation Example 2

Preparation of Styrenic Block Copolymer Including Palm Wax

A 2-L high-pressure reactor was sufficiently purged with argon gas. Then, after adding purified cyclohexane (900 g), THF (2,000 ppm) and styrene (31 g), temperature was maintained at 60° C. Then, n-BuLi (1 mmol in cyclohexane, 2 M) was added to the reactor as initiator. When the polymerization temperature reached the highest temperature, butadiene (138 g) was added 10 minutes later. When the polymerization temperature reached the highest temperature, styrene (31 g) was added to the reactor 5 minutes later. Then, methanol was added to the polymerization solution as polymerization terminator to completely terminate living polymerization. After adding an antioxidant and palm wax (90 g) to the resulting polymerization solution, followed by removal of cyclohexane using a roll mill, a styrenic block copolymer (2) was prepared.

Preparation Example 3

Preparation of Styrenic Block Copolymer

A 2-L high-pressure reactor was sufficiently purged with argon gas. Then, after adding purified cyclohexane (900 g), THF (2,000 ppm) and styrene (62 g), temperature was maintained at 60° C. Then, n-BuLi (2 mmol in cyclohexane, 2 M) was added to the reactor as initiator. When the polymerization temperature reached the highest temperature, butadiene (138 g) was added 10 minutes later. When the polymerization temperature reached the highest temperature, the coupling agent dichlorodimethylsilane (1 mmol) was added 5 minutes later to induce coupling of living polymers. Then, a small amount of methanol was added to the polymerization solution as polymerization terminator to completely terminate living polymerization. After adding an antioxidant to the resulting polymerization solution, followed by removal of cyclohexane using a roll mill, a styrenic block copolymer (3) was prepared.

Preparation Example 4

Preparation of Styrenic Block Copolymer

A 2-L high-pressure reactor was sufficiently purged with argon gas. Then, after adding purified cyclohexane (900 g), THF (150 ppm) and styrene (62 g), temperature was maintained at 60° C. Then, n-BuLi (2 mmol in cyclohexane, 2 M) was added to the reactor as initiator. When the polymerization temperature reached the highest temperature, butadiene (138 g) was added 10 minutes later. When the polymerization temperature reached the highest temperature, the coupling agent dichlorodimethylsilane (1 mmol) was added 5 minutes later to induce coupling of living polymers. Then, a small amount of methanol was added to the polymerization solution as polymerization terminator to completely terminate living polymerization. After adding an antioxidant to the resulting polymerization solution, followed by removal of cyclohexane using a roll mill, a styrenic block copolymer (4) was prepared.

Molecular weight, microscopic structure and composition of the styrenic block copolymers prepared in Preparation Examples 1-4 were analyzed as follows. The result is summarized in Table 1.

1) Molecular Weight of Styrenic Block Copolymers

High-performance liquid chromatography (separation's module Waters 2690) and a detector (differential refractometer, Waters 410) were used for molecular weight analysis. Column temperature was 40° C., eluent was THF, and flow rate was 1.0 mL/min. Divinylbenzene Styragel columns HR 5E, HR 4 and HR 2 were serially connected and difference of refractory index was detected using standard polystyrene as reference.

2) Microscopic Structure and Composition of Styrenic Block Copolymers

Styrene and butadiene contents as well as microscopic structure were analyzed by nuclear magnetic resonance spectroscopy (Bruker NMR-400). 1,1,2,2-Tetrachloroethane-$d_2$ was used as solvent.

TABLE 1

|  | Styrene content[1] (wt %) | Vinyl content[2] (mol %) | Block ratio[3] (%) | Coupling ratio[4] (wt %) | Weight-average molecular weight ($M_w$) |
|---|---|---|---|---|---|
| Preparation Example 1 | 30.8 | 40.1 | 96 | — | 93,000 |
| Preparation Example 2 | 30.8 | 40.1 | 96 | — | 93,000 |
| Preparation Example 3 | 30.5 | 41.1 | 99 | 91.1 | 94,000 |
| Preparation Example 4 | 31.0 | 13.5 | 98 | 87.5 | 95,000 |

[1] Styrene content: content of styrene based on block copolymer
[2] Vinyl content: content of vinyl based on butadiene block
[3] Block ratio: ratio of styrene existing as block based on total styrene monomer Examples Preparation of Modified Asphalt Composition Examples 1-7 and Comparative Examples 1-5

Pure asphalt in molten state, a styrenic block copolymer and palm wax were mixed as described in Table 2 in a high-speed shear mixer at 180° C. for 40 minutes to prepare a polymer-modified asphalt binder.

TABLE 2

|  | Modified asphalt composition (parts by weight) | | |
|---|---|---|---|
|  | Asphalt | Styrenic block copolymer | Palm wax |
| Example 1 | 100 | 4.3 (Preparation Example 1) | 2 |
| Example 2 | 100 | 6.3 (Preparation Example 2*) | |
| Example 3 | 100 | 4.3 (Preparation Example 3) | 2 |
| Example 4 | 100 | 4.3 (Preparation Example 4) | 2 |
| Example 5 | 100 | 4.3 (Preparation Example 1) | 4 |
| Example 6 | 100 | 4.3 (Preparation Example 3) | 4 |
| Example 7 | 100 | 4.3 (Preparation Example 4) | 4 |
| Comparative Example 1 | 100 | 4.3 (Preparation Example 1) | 0 |
| Comparative Example 2 | 100 | 4.3 (Preparation Example 3) | 0 |
| Comparative Example 3 | 100 | 4.3 (Preparation Example 4) | 0 |
| Comparative Example 4 | 100 | 0 | 2 |

*Copolymer of Preparation Example 2: 2 parts by weight of palm wax is included in 4.3 parts by weight of styrenic block copolymer Test Example Physical Properties of Modified Asphalt Compositions Physical properties of the modified asphalt compositions of Examples 1-7 and Comparative Examples 1-4 were measured as follows. The result is given in Table 3.

1) Softening point was measured according to ASTM D36.

2) Ductility was measured according to ASTM DI 13 at 5±0.5° C. at a speed of 5 cm/min±0.5%.

3) Viscosity was measured at various temperatures using a rotating viscometer.

TABLE 3

| | Physical properties of compositions | | | | | |
|---|---|---|---|---|---|---|
| | Softening point | Ductility (cm) | | Viscosity | | |
| | | Before heating | After heating | 110° C. | 130° C. | 160° C. |
| Example 1 | 80.8 | 47.3 | 15.7 | 3600 | 1100 | 347 |
| Example 2 | 81.5 | 46.9 | 15.8 | 3455 | 1083 | 321 |
| Example 3 | 80.1 | 43.5 | 13.9 | 3345 | 1066 | 315 |
| Example 4 | 79.7 | 45.4 | 17.3 | 4766 | 1265 | 443 |
| Example 5 | 75.5 | 50.4 | 17.1 | 3285 | 1024 | 325 |
| Example 6 | 74.4 | 48.3 | 16.2 | 3218 | 993 | 301 |
| Example 7 | 72.1 | 51.4 | 18.2 | 4380 | 1256 | 421 |
| Comparative Example 1 | 81.5 | 25.6 | 12.1 | 4425 | 1325 | 447 |
| Comparative Example 2 | 80.1 | 24.2 | 11.4 | 4235 | 1301 | 438 |
| Comparative Example 3 | 79.7 | 27.0 | 12.4 | 5090 | 1445 | 470 |
| Comparative Example 4 | 42.1 | 98 | 22.9 | 890 | 434 | 169 |

As seen from Table 3, the compositions of Examples 1 and 2 which were prepared using the styrenic block copolymer and the vegetable wax as modifier either alone or in admixture, had almost identical physical properties.

The compositions of Example 4 or Example 7, which comprised the styrenic block copolymer with a relatively lower vinyl content, exhibited higher viscosity at the same temperature when compared with the compositions comprising the styrenic block copolymer with a higher vinyl content (Examples 1-3 or Examples 5-6). Accordingly, it can be seen that use of a styrenic block copolymer with a high vinyl content provides an effect of decreasing viscosity at high temperature.

The modified asphalt composition of Comparative Example 4, which was modified only with the vegetable wax, showed decreased viscosity of asphalt, but it showed degradation of physical properties including abrupt decrease of softening point of asphalt.

The asphalt compositions of Examples 1-7, which were modified with the vegetable wax and the styrenic block copolymer, showed comparable softening point but remarkably improved ductility at low temperature due to the addition of palm wax, when compared with those of Comparative Examples 1-3. Also, the addition of palm wax resulted in decreased viscosity at high temperature. Accordingly, it can be seen that modification of asphalt with the styrenic block copolymer and the vegetable wax can solve the viscosity problem at high temperature and improve low-temperature properties.

As described, since the asphalt composition of the present invention comprising the styrenic block copolymer and the vegetable wax as asphalt modifier has low viscosity at high temperatures, energy consumption during manufacture of asphalt and construction the same can be minimized. Thus, it is expected to significantly improve productivity and is applicable to the environment-friendly warm mix asphalt. Also, since the asphalt composition of the present invention has improved ductility at low temperatures, it can minimize road damage caused by, for example, fatigue crack even in cold weathers.

The asphalt composition of the present invention, which comprises the styrenic block copolymer represented by the chemical formula 1 or 2 as well as the vegetable wax as modifier, has decreased viscosity at high temperatures and significantly improved ductility at low temperatures when compared with the asphalt composition modified only with the styrenic block copolymer. Accordingly, the modification temperature can be lowered and the resulting modified asphalt has excellent low-temperature stability.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A modified asphalt composition comprising:
   asphalt;
   a styrenic block copolymer represented by the chemical formula 1 or 2; and
   a palm wax with a melting temperature of approximately 60° C. or a hydrogenated palm wax with a melting temperature of approximately 55-65° C.;

$$(A\text{-}B)_n X \qquad (1)$$

$$A\text{-}B\text{-}A \qquad (2)$$

wherein A is a unit comprising an aromatic vinyl monomer having a weight-average molecular weight ($M_w$) of 3,000-30,000; B is a unit comprising a conjugated diene monomer or a unit comprising a conjugated diene monomer and an aromatic vinyl monomer, having a weight-average molecular weight ($M_w$) of 20,000-200,000; n is an integer of 2 to 6; and X is a residue of a coupling agent.

2. A modified asphalt composition comprising:
   a) asphalt; and
   b) a styrenic block copolymer represented by the chemical formula 1 or 2 in which a palm wax with a melting temperature of approximately 60° C. or a hydrogenated palm wax with a melting temperature of approximately 55-65° C. is incorporated, $$(A\text{-}B)_n X \qquad (1)$$

$$A\text{-}B\text{-}A \qquad (2)$$

wherein A is a unit comprising an aromatic vinyl monomer having a weight-average molecular weight ($M_w$) of 3,000-30,000; B is a unit comprising a conjugated diene monomer or a unit comprising a conjugated diene monomer and an aromatic vinyl monomer, having a weight-average molecular weight ($M_w$) of 20,000-200,000; n is an integer of 2 to 6; and X is a residue of a coupling agent.

3. The modified asphalt composition of claim 1, which comprises 0.5-40 parts by weight of the styrenic block copolymer and 0.25-30 parts by weight of the palm wax or hydrogenated palm wax based on 100 parts by weight of the asphalt.

4. The modified asphalt composition of claim 1, wherein A is a unit comprising an aromatic vinyl monomer having a weight-average molecular weight ($M_w$) of 10,000-25,000, B is a unit comprising a conjugated diene monomer or a unit comprising a conjugated diene monomer and an aromatic vinyl monomer, having a weight-average molecular weight ($M_w$) of 40,000-150,000, and n is an integer of 2 to 4.

5. The modified asphalt composition of claim 1, wherein the content of the unit A is 5-40 wt % based on the weight of the styrenic block copolymer represented by the chemical formula 1 or 2.

6. The modified asphalt composition of claim 1, wherein the vinyl content of the unit B is 10-80 mol %.

7. The modified asphalt composition of claim 1, wherein the aromatic vinyl monomer is one or more selected from a group consisting of styrene, α-methylstyrene, o-methylstyrene, p-methylstyrene and p-tert-butyl styrene.

8. The modified asphalt composition of claim 2, which comprises 0.5-40 parts by weight of the styrenic block copolymer and 0.25-30 parts by weight of the palm wax or hydrogenated palm wax based on 100 parts by weight of the asphalt.

9. The modified asphalt composition of claim 2, wherein A is a unit comprising an aromatic vinyl monomer having a weight-average molecular weight ($M_w$) of 10,000-25,000, B is a unit comprising a conjugated diene monomer or a unit comprising a conjugated diene monomer and an aromatic vinyl monomer, having a weight-average molecular weight ($M_w$) of 40,000-150,000, and n is an integer of 2 to 4.

10. The modified asphalt composition of claim 2, wherein the content of the unit A is 5-40 wt % based on the weight of the styrenic block copolymer represented by the chemical formula 1 or 2.

11. The modified asphalt composition of claim 2, wherein the vinyl content of the unit B is 10-80 mol %.

12. The modified asphalt composition of claim 2, wherein the aromatic vinyl monomer is one or more selected from a group consisting of styrene, α-methylstyrene, o-methylstyrene, p-methylstyrene and p-tert-butylstyrene.

* * * * *